United States Patent
Vaillon et al.

(10) Patent No.: US 8,395,764 B2
(45) Date of Patent: Mar. 12, 2013

(54) DEVICE FOR MEASURING THE LINE OF SIGHT JITTER OF AN OPTICAL INSTRUMENT

(75) Inventors: Ludovic Vaillon, Toulouse (FR); Stephane Deyber, Saint-Sulpice (FR)

(73) Assignee: Astrium SAS, Paris (FR)

( * ) Notice: Subject to any disclaimer, the term of this patent is extended or adjusted under 35 U.S.C. 154(b) by 254 days.

(21) Appl. No.: 12/868,807

(22) Filed: Aug. 26, 2010

(65) Prior Publication Data

US 2011/0049328 A1 Mar. 3, 2011

(30) Foreign Application Priority Data

Aug. 28, 2009 (FR) ...................................... 09 55864

(51) Int. Cl.
*G01B 11/26* (2006.01)

(52) U.S. Cl. ........................................................ 356/153

(58) Field of Classification Search ............... 250/201.1, 250/203.1, 221; 356/153, 248, 253–255, 356/399, 614; 398/136

See application file for complete search history.

(56) References Cited

U.S. PATENT DOCUMENTS

| | | | | |
|---|---|---|---|---|
| 4,662,727 | A | * | 5/1987 | Griffin ........................... 359/351 |
| 6,020,955 | A | * | 2/2000 | Messina ........................ 356/138 |
| 7,227,111 | B2 | * | 6/2007 | Eckelkamp-Baker et al. ............................ 250/201.1 |
| 2002/0145102 | A1 | * | 10/2002 | Eckelkamp-Baker et al. ........................... 250/203.1 |

OTHER PUBLICATIONS

French Search Report, dated Apr. 28, 2010, corresponding from French Application.

* cited by examiner

*Primary Examiner* — Thanh Luu
*Assistant Examiner* — Renee Naphas
(74) *Attorney, Agent, or Firm* — Young & Thompson

(57) ABSTRACT

Device for measuring the line of sight jitter of an optical instrument mounted on an optical platform, includes:

an optical measurement path primarily common with the observation path of the optical instrument, a light measurement source arranged essentially at one end of the optical observation path, a detector for measuring the optical beam coming from the light measurement source, arranged such that this beam has passed through the optical observation path at least once, at least one collimation mirror designed for the reflection of the optical beam, arranged essentially on the optical observation path, essentially at the other end of the optical observation path, relative to the light measurement source, whereby this mirror is isolated by at least one passive isolator of lateral vibrations (i.e., inducing a rotation of the perpendicular line of the mirror) generated by the optical platform in a predetermined frequency range.

11 Claims, 3 Drawing Sheets

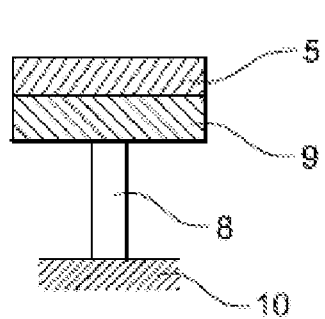
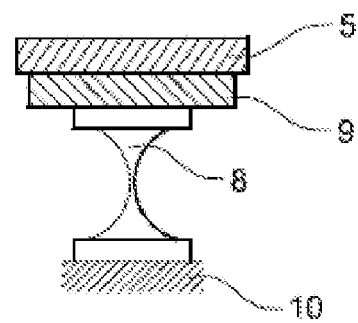
Fig. 3a          Fig. 3b
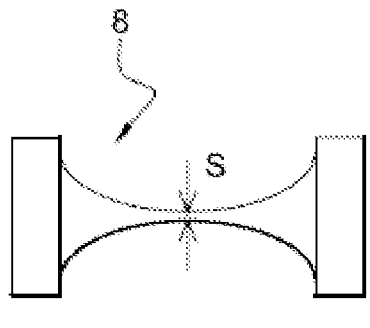
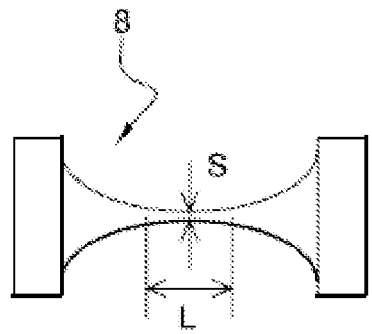
Fig. 4a          Fig. 4b
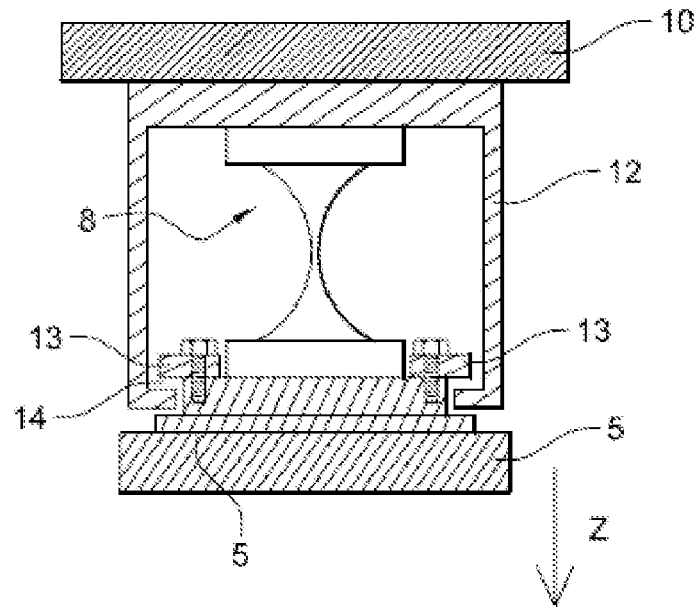
Fig. 5

DEVICE FOR MEASURING THE LINE OF SIGHT JITTER OF AN OPTICAL INSTRUMENT

BACKGROUND OF THE INVENTION

1. Field of the Invention

This invention pertains to the field of optical instrumentation. It relates more specifically to remote observation instruments comprising a complex optical path and requiring precise pointing.

2. Description of the Related Art

In the field of remote observation, numerous devices require maintaining a stable pointing of the observation instrument, independently of the perturbations generated by the numerous sources of vibrations, random in frequency and amplitude, created by the mechanical assembly and the support device.

This is the case, for example, of image acquisition means as they are known in the field of planetary observation, by satellite or by aircraft, typically using a bar or matrix detector and a movement of the sensor platform, making it possible to scan a swath of the planet's surface that is being observed.

The pointing of a stationary point (line of sight) is therefore necessary for the reconstitution of images and, failing this, it is desirable to know the instantaneous movement (commonly called "jitter") of the line of sight.

It is clear that the higher the resolution of the image, the greater the need for a stable line of sight.

Along the same lines, devices for communication by laser, for example between satellites, also require extremely precise pointing of their line of sight. One problem that is analogous to the line of sight stabilization is then posed.

Solutions for stabilization of optical line of sight have already been considered. One of the known solutions is to place the optical platform on a vibration damping system, for example an active system for detecting vibrations and for correcting these vibrations in real time. However, these devices are complex, restrictive for the design of the instrument, and often exhibit inadequate performances for the remote imagery systems currently envisioned. Furthermore, the optical assembly itself can generate perturbations in the line of sight, which, of course, are not corrected by a system as previously described.

Another solution is then provided by the user, known in the art, of a so-called inertial reference, such as, for example, a star, whose position is essentially stationary relative to the earth over the period of acquisition of an image.

Another solution is disclosed in the U.S. Pat. No. 6,700,109 B2 of 2004. In this document, a device for active correction of line-of-sight vibrations uses a pseudo-inertial reference generator that takes the form of a laser source, stabilized inertially with an actual active monitoring device.

This laser source is arranged in such a way that its beam essentially follows the optical path of the light rays coming from the observed zone such that the sight modifications of this pseudo-inertial source can be considered as being due integrally to the vibrations of the optical platform. These vibrations are then detected by a matrix detector that is placed in the vicinity of the image sensor and corrected by manipulating the orientation of one of the mirrors for reflecting the light beam on the optical path.

However, the implementation of an active monitoring system at the input of the optical instrument is complex and has a strong impact on the design of the instrument, for example imposes the creation of an electrical network for supplying this system and modifies the heat monitoring constraints, which increases the cost of the instrument.

SUMMARY OF THE INVENTION

The objective of this invention is then to propose a new device for measuring the line of sight jitter and thus to respond to at least a portion of the problems described above.

According to a second object of the invention, the latter is particularly suited to the treatment of vibrations in a frequency band that ranges from approximately 10 Hz to several hundred Hz.

For this purpose, the object of the invention is a device for measuring the line of sight jitter of an optical instrument that comprises an observation path, whereby said optical instrument is mounted on an optical platform, said device comprising:

an optical measurement path that is basically common with the observation path of the optical instrument, a light measurement source that is arranged at one end of the optical observation path, a detector for measuring the optical beam that comes from the light measurement source, arranged in such a way that this measurement beam has passed through the optical observation path at least once, the device also comprising at least one light reference arranged on the optical measurement path, passive isolation means of this light reference with regard to lateral vibrations transmitted by the optical platform in a predetermined range of frequencies, thus creating a pseudo-inertial light reference.

"Pseudo-inertial" is defined here as a reference that is mechanically decoupled from the quivering of the platform in a determined range of frequencies. One significant point of the invention is that these are passive isolation means that create a pseudo-inertial reference. Its behavior is primarily identical, in a particular range of frequencies defined by the selection of passive isolation means, to that of an inertial reference such as a gyroscope. The implementation of the device as disclosed is, in contrast, clearly simpler than that of a gyroscope.

It is understood here that the pseudo-inertial light reference can be either the light measurement source itself, or a mirror that is arranged on the optical path.

Preferably, the frequency isolation band of the collimation mirror is between several Hz and several hundred Hz.

According to one embodiment, the pseudo-inertial light reference is a collimation mirror that is designed to reflect the optical beam, arranged essentially on the optical observation path, at the other end of the optical observation path, relative to the light measurement source.

Alternatively, the pseudo-inertial light reference is the light source, for example laser, endowed with passive isolation means and mechanically decoupled from the platform. The light source can be arranged in the focal plane beside the measurement detector, combined with a collimation mirror that is linked to the platform. The light source can also be arranged at the input of the instrument, instead of the collimation mirror. In this latter case, the light beam can only go one way, into the instrument, which reduces the sensitivity.

According to a preferred embodiment, at least one passive isolator comprises a segment in the form of a beam made of flexible material with a large damping coefficient, for example an elastomer material, suitable for filtering lateral vibrations that are imposed on its platform in the predetermined frequency range.

Lateral is defined here as the vibrations of the platform that can produce a variation of the direction of the reflection of the mirror or emission from the source.

Below, for the sake of clarity, elastomer is termed the material of the flexible body, without this presuming the nature of this material.

Advantageously, the passive isolator is an elastomer beam with a convergent/divergent cross-section called a "diabolo."

Alternatively, the passive isolator is an elastomer beam with a constant cross-section that is made integral with its two ends, on the one hand at a structure that supports the pseudo-inertial light reference, and, on the other hand, at the interface with the optical instrument.

So as to make possible a damping of the frequencies of vibrations of between approximately 10 Hz and several hundred Hz, the elastomer beam is preferably made of a material that has a low Young module and that does not change much within the functional temperature range.

Preferably, the device comprises a rigid intermediate structure that is made integral by one end with the platform of the optical instrument, this intermediate structure comprising means for limiting the movement of the structural interface of the pseudo-inertial light reference when the instrument is subjected to acceleration conditions encompassed in a predetermined range.

It is understood that these means are designed to take up mechanical forces generated by, for example, a temporary vertical acceleration so as to avoid transmitting to the elastomer support disproportionate forces with its mechanical strength; these means do not obstruct the free movement of the structural interface of the collimation mirror when the instrument is not subjected to these acceleration conditions, whereby said movement is then encompassed in a previously determined interval of values. This interval corresponds to the maximum amplitude of the vibrations to which the optical instrument can be subjected during its operational use.

Advantageously in this case, the intermediate structure comprises lower edges that are equipped with stops, made integral with the structural interface of the collimation mirror, the respective arrangement of the stops and lower edges of the intermediate structure determining a free space when the optical instrument is in operational conditions, for example in zero gravity for use in orbit.

In this case, the collimation mirror is suspended by the elastomer supports without contact on the stops and has a pseudo-inertial behavior.

According to a particular embodiment, the pseudo-inertial light reference is suspended by a single passive isolator, essentially directed along an axis that is perpendicular to the collimation mirror.

According to a second embodiment, the pseudo-inertial light reference is suspended by N passive isolators (N>1) having their axes arranged in the same plane that is perpendicular to the direction of the vertical axis of the collimation mirror, whereby these N axes converge at the vertical axis of the collimation mirror, these passive isolators being uniformly angularly spaced. For example, the configuration with 3 isolators arranged at 120 degrees constitutes a particularly advantageous case but other configurations are possible.

According to another embodiment, the pseudo-inertial light reference is suspended by N passive isolators (N>1), collinear axes, parallel to the vertical axis of the collimation mirror, and arranged uniformly over a circle under the structural interface. For example, the configuration with 3 isolators arranged on the tops of an equilateral triangle centered on the axis of the mirror constitutes a particularly advantageous case, but other configurations are possible.

Under another aspect, the object of the invention is a device for active monitoring of high-frequency vibrations of the optical instrument's line of sight, whereby said monitoring device comprises a jitter measuring device as disclosed, and, in addition, means for correcting the jitter of the optical observation beam by manipulating the orientation of a controllable plane mirror that is placed on the optical observation path.

BRIEF DESCRIPTION OF THE FIGURES

The following description, provided only by way of example, of an embodiment of the invention, is done by referring to the accompanying figures in which:

FIG. 3 shows the geometry of the elastomer support with a constant cross-section version (FIG. 3A) and a so-called "diabolo" cross-section version (FIG. 3B), FIG. 4 likewise illustrates two "diabolo" isolator geometries, In diagram form, FIG. 5 shows a mounting of a mirror on a "diabolo" support, FIGS. 6a and 6b likewise illustrate two assemblies using three "diabolos,"

DETAILED DESCRIPTION OF AN EMBODIMENT OF THE INVENTION

Figure 1:
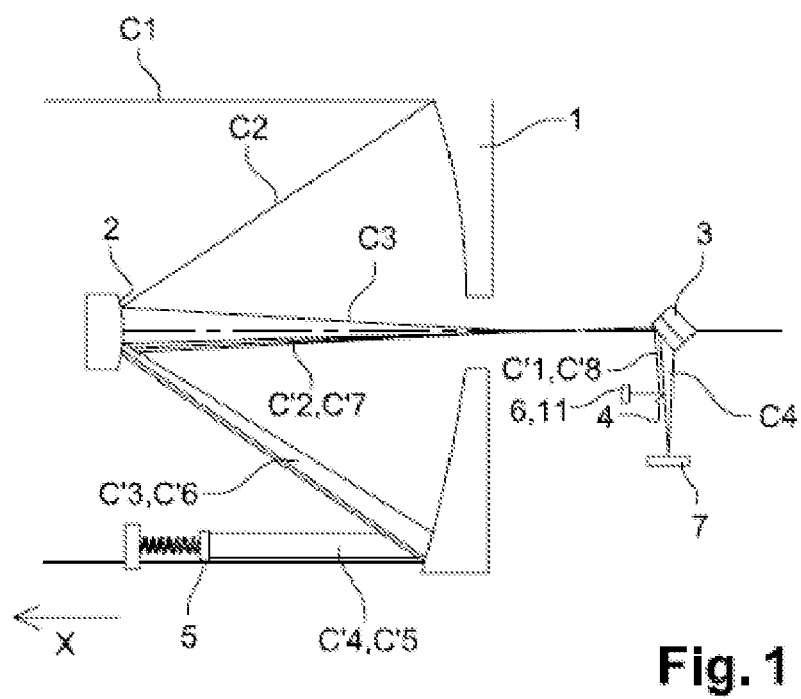
FIG. 1 is a schematic diagram of the device for measuring the line of sight jitter ("LOS Jitter" in English) according to the invention, FIG. 2 likewise illustrates the measuring principle, on the one hand for the optical path coming from the observed scene (FIG. 2A) and on the other hand for the "laser source+isolated mirror" optical path (FIG. 2B), In diagram form.

As is seen in FIG. 1, the device according to the invention finds its place within an optical instrument that enables remote observation of objects located in a predetermined direction X relative to said instrument.

The instrument in question in this example that is not at all limiting is designed to be loaded on a satellite and therefore to operate in a zero-gravity environment.

The instrument comprises a primary mirror 1 that receives the light rays coming from the observed object (segment C1 of the optical observation path C), and concentrates them on a secondary convex mirror 2 (segment C2 of the optical observation path C). This secondary mirror 2 in its turn reflects the light beam (segment C3 of the optical observation path C) to a plane mirror 3, oriented essentially at 45° of the observation direction X, and whose orientation around two axes perpendicular to its perpendicular line can be controlled.

In this example, the controllable plane mirror 3 is a mirror of several tens of millimeters in diameter, mounted on flexible metal blades. Electromagnetic actuators make it possible to modify the orientation of the mirror on two axes, with an amplitude of several milliradians to several tens of milliradians. Capacitive sensors are used to determine at each moment the orientation of said controllable plane mirror 3.

This controllable plane mirror 3 as such, however, exceeds the scope of this invention and is therefore not described in further detail here.

Figure 2A:
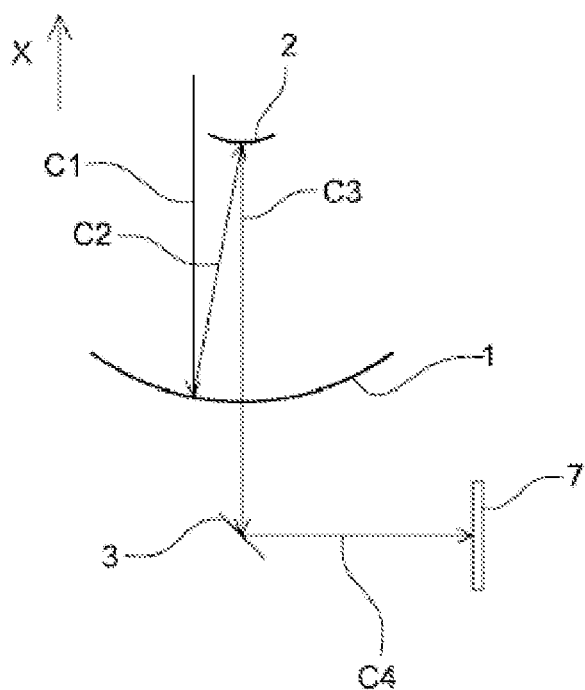

The light beam that is obtained from this controllable plane mirror 3 (segment C4 of the optical observation path C) is intercepted by an observation detector 7 placed in the focal plane. The optical observation path C is shown in diagram form in FIG. 2a.

The different elements of the optical instrument that were just described are of the type known in the art and as such exceed the scope of this invention. They are therefore not described in further detail here.

Figure 2B:
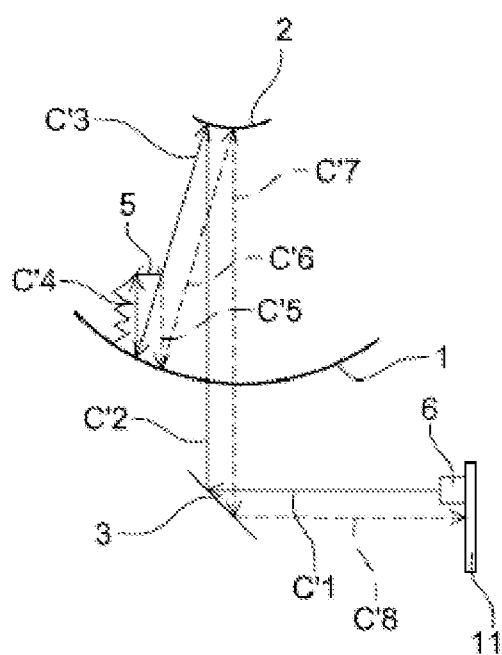

In contrast, the device according to the invention also comprises a second optical path C' for measurement of the high-frequency line of sight jitter (see FIG. 2b). Here, high frequency means a frequency band of between several Hz and several hundred Hz.

This optical measurement path C' first comprises a light source 6, arranged in the focal plane of the optical instrument. This source 6 takes on, for example, the form of a laser diode that operates in the visible or near-infrared spectrum, compatible with CCD- or CMOS-type silicon detectors. Because of the very short length of the optical path, on the order of several meters in the case of remote observation instruments, a power of less than 1 milliwatt is sufficient for the laser diode 6.

In this nonlimiting example, the laser diode 6 is coupled to the focal plane of the optical instrument using an optical fiber that is known in the art, which makes it possible to move the laser diode 6 itself away from the optical measurement path C'.

The laser diode 6 is equipped with collimation optics of the type that is known in the art, used to reduce the dispersion of the beam that comes from said laser diode 6, in such a way that this beam is permanently encompassed in the surface of mirrors placed on its optical path C'.

This laser diode 6 emits a light measurement beam toward a reflecting mirror 4 (not shown in FIG. 2b but visible in FIG. 1) that in its turn sends it to the plane mirror 3 (segment C'1 on the optical measurement path C').

The optical measurement beam is then reflected first to the secondary mirror 2, and then toward an edge of the primary mirror 1 (segments C'2 and C'3 of the optical measurement path C'). After reflection on the primary mirror 1, the optical measurement beam will strike a pseudo-inertial collimation mirror 5, arranged perpendicularly to this optical beam (segment C'4 of the optical measurement path C').

This collimation mirror 5 is called pseudo-inertial because it is placed on an elastomer support 8 that is suitable for filtering the high-frequency lateral vibrations that are imposed on its support.

Two arrangements are shown in diagram form in FIG. 3: an elastomer support 8 with a constant cross-section (left FIG. 3a) and an elastomer support 8 with a so-called "diabolo" convergent/divergent cross-section (right FIG. 3b).

In these FIGS. 3a and 3b, the pseudo-inertial collimation mirror 5, a structural interface, for example, metal structural interface 9, the elastomer support 8, and the base that forms a part of the platform 10 of the optical instrument are identified.

In this example, the collimation mirror 5 has a diameter on the order of several tens of millimeters, the metal structural interface has a thickness of approximately two millimeters, and the weight of the unit (collimation mirror 5+metal structural interface 9) is several tens of grams. It is this mass that is to be isolated from high-frequency vibrations by the elastomer support.

The preferred arrangement of the elastomer support 8, in "diabolo" form, ensures both good attachment of the elastomer support 8 to the structural interface 9 that supports the pseudo-inertial collimation mirror 5 and a good isolation of the high frequencies because of its small minimal cross-section S.

In a more detailed manner, several variants of the form of the "diabolo"-type elastomer support 8 can be considered, as illustrated in, for example, FIG. 4.

These variants are distinguished by the minimal cross-section S and by the length L of the thin part.

It is noted, by a calculation that is known in the art, that it is preferable to have a minimal cross-section S that is the thinnest possible, and a length L of the thin part that is the largest possible to bring back the two first actual modes of lateral vibrations of the unit (elastomer support 8+collimation mirror 5+metal structural interface 9) into a range of very low frequency, close to or less than about 10 Hz, according to the requirements of the isolation application envisioned.

In this case, a minimal cross-section S with a diameter of one to two millimeters of diameter is selected. The length L of the thin part is several millimeters, and the total length of the elastomer support 8 is approximately 20 millimeters.

Typically, for a lateral excitation of 1 mm of the elastomer support 8 that supports the unit (collimation mirror 5+metal structural interface 9) with a frequency that is less than one Hz, the movement of the collimation mirror 5 is essentially identical to, and even greater than, one millimeter. Between one and ten Hz of excitation frequency, the resulting movement of the collimation mirror 5 passes through a minimum on the order of several hundredths of a millimeter, before returning to around one millimeter for the second resonant mode of the elastomer support 8.

Figure 7:
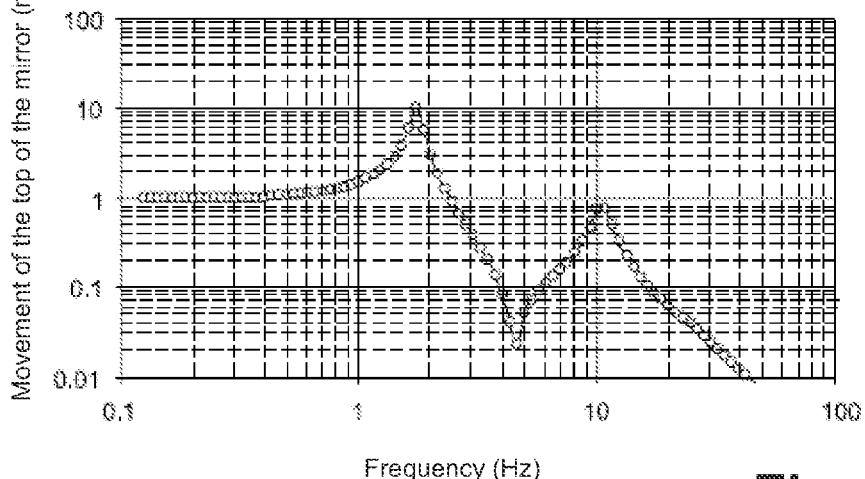
FIG. 7 illustrates a transfer function of a device as described.

FIG. 7 illustrates the transfer function of a device as described.

Above an excitation frequency of 10 Hz, the resulting displacement of the collimation mirror 5 rapidly descends with the frequency to be less than one hundredth of a millimeter to above approximately 100 Hz.

A damping of the high-frequency vibrations and a "ps" reference in these frequencies are duly obtained.

In this example, the elastomer support 8 is made of an elastomer material that consists of a mixture of natural rubber and butyl in proportions resulting from a compromise:

The natural rubber provides flexibility, isolation properties at high frequency, and a stability based on the high temperature; however, it does not have significant damping properties.

The butyl provides advantageous damping properties on the actual modes of the unit so as to limit the amplifications of movement on these modes; by contrast, it has a tendency to be less flexible and less well isolating at high frequency.

The elastomer support is produced by a method that is known to one skilled in the art, for example by molding.

The optical measurement beam then follows a reverse optical path (segments C'5 to C'8 of the optical measurement path C'), so-called return laser beam, which brings it to a measuring detector 11, mounted in the immediate vicinity of the laser diode 6. The optical measurement path C' is shown in a diagram in FIG. 2b.

As is noted, the optical measurement path C' is formed by segments that are essentially merged with the segments of the optical observation path C. As is understood, the measurement beam passes through the optical observation path twice in its lower part to the optical instrument, which increases the sensitivity of the measurement to deformations of this optical observation path.

It is understood that in the absence of any movement or deformation of the line of sight, the light rays that come from the object to be observed are sent to the center of the observation detector 7 placed in the focal plane of the instrument (in the case of a point object located in infinity).

Likewise, in the absence of any deformation of the optical measurement path C', the light rays that come from the laser diode 6 return after passing through the optical measurement path C' to this laser diode 6. By design and alignment, a slight orientation bias of the collimation mirror is imposed so that the reflected rays are focused on the center of the observation detector 7.

In contrast, in the event of movement or deformation of the optical instrument, under the effect of high-frequency vibrations, the optical beam that comes from the observed object is off-center relative to the observation detector 7.

Simultaneously, with the pseudo-inertial collimation mirror 5 being suspended on an isolated support of high-frequency vibrations, in the event of movement or deformation of the optical instrument because of these high-frequency vibrations, this pseudo-inertial collimation mirror 5 does not move, whereas the remainder of the optical instrument moves, and the optical measurement beam reaches the measuring detector 7 beside the laser diode 6.

The determination of this shift of the optical measurement beam is done using a deviation-measurement sensor that exceeds the scope of this invention.

The functions of the deviation-measurement sensor are, on the one hand, during the operation of the optical instrument, to detect the initial position of the return laser beam (due to a possible misalignment of the pseudo-inertial collimation mirror 5), and, on the other hand, during normal operation, to measure, at regular intervals, the distance between the position of the return laser beam and this initial position. This distance measurement is executed, for example, by passing through the closest pixels of the sensor of the preceding measured position.

This determination of the shift of the optical measurement beam (line of sight "jitter") then makes it possible to correct the shift of the optical observation beam by manipulating the orientation of the controllable plane mirror 3.

The observation detector measures the line of sight jitter at a rate that is much higher than the frequency of the vibrations that are to be compensated for, in practice between several hundred and several thousand Hz.

The use of a numerical calculation method (known in the art) makes it possible to control the plane mirror 3 so as to compensate in a closed loop for the angular jitter around the two axes that are perpendicular to the line of sight. Its use with a given configuration of the optical instrument and elastomer support makes it possible to confirm that the high-frequency vibrations between about 10 Hz and several hundred Hz are in effect rejected by the active line-of-sight monitoring device as described.

In the particular embodiment envisioned here, suitable for an optical instrument integrated on a satellite, particular constraints linked to the launch of the satellite should be taken into account in the design of the support of the pseudo-inertial collimation mirror 5.

FIG. 5 then illustrates, in a side view, a first structural support configuration of the collimation mirror 5. In this FIG. 5, a direction Z is indicated. It is noted that this direction Z is not necessarily the local vertical. Actually, forces at launch along the vertical are more significant, to be sure, but the dynamic movements of the launch ensure that the lateral forces also exceed the strength of the elastomer. The stop system is therefore to ensure the limitation of movements in the three directions. It is therefore not necessary to force the orientation of the mirror relative to the vertical during launch.

In this figure, the pseudo-inertial collimation mirror 5, the structural interface 9, the elastomer support 8, and the base that forms part of the platform 10 of the optical instrument, essentially aligned in the direction Z, are shown.

In contrast, the device also comprises here an intermediate structure 12, for example made of metal or a composite material and made integral by its upper end with the platform 10 of the optical instrument. By its lower edges, this intermediate structure 12 works with detachable stops 13, attached, for example, by bolting onto the structural interface 9 of the collimation mirror 5.

As can be seen in FIG. 5, the respective arrangement of the stops 13 and the lower edges of the intermediate structure 12 determines a free space 14 when the optical instrument is under zero-gravity conditions. In this case, the collimation mirror 5 is only suspended by the elastomer support 8 and has, as has been said, a pseudo-inertial behavior.

By contrast, under Earth's gravity or during launch, the stops 13 will rest on the lower or lateral edges of the intermediate structure 12 and therefore take up the forces generated by the launch or gravity, without the elastomer support 8 being subjected to excessive traction. More generally, this device limits the translational movements in the three possible directions as well as the rotations along these axes.

So as to be able to test the device under gravity, the latter is to be arranged according to FIG. 5 where the gravity is directed downward. The stops 13 are then detached, and the mirror is suspended by elastomer. The stiffness in traction of the elastomer is to be adequate so that the elongation under the effect of gravity does not damage it and makes it possible to measure the performance levels of the suspension.

The dimensioning of the intermediate structure 12 is carried out in a known way by one skilled in the art by taking into account maximum loads to take up during launch (in particular maximum allowable deformations in the elastomer, imposing the use of previously described stops).

Figure 6A:
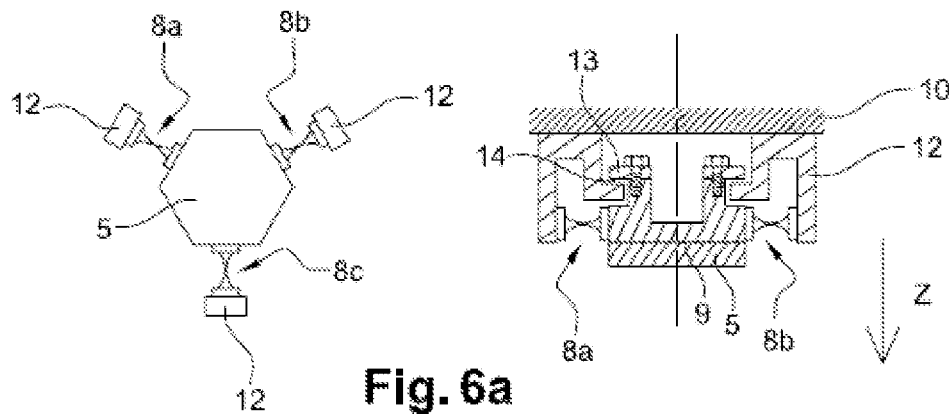

In another embodiment that is illustrated diagrammatically in FIG. 6a (in bottom view and in side view), also suitable for taking up forces generated during the launch of the satellite that bears the optical instrument, the collimation mirror 5 is suspended by three "diabolo"-type elastomer supports 8a, 8b, and 8c.

Here, these three elastomer supports 8a, 8b, and 8c have their axes arranged in the same plane that is perpendicular to the vertical direction Z, whereby these three axes merge at the vertical axis of the collimation mirror 5. These three elastomer supports 8a, 8b and 8c are angularly spaced by 120°.

A frequency reduction of the first actual oscillation modes of the unit (elastomer support 8+collimation mirror 5+metal structural interface 9) is thus obtained.

In this embodiment, during launch, the elastomer supports 8a, 8b, and 8c are primarily deformed laterally, contrary to the preceding device, in which the primary deformation was longitudinal.

It is clear that it is conceivable to use a larger number of elastomer supports 8 without substantial modifications of the device.

Figure 6B:
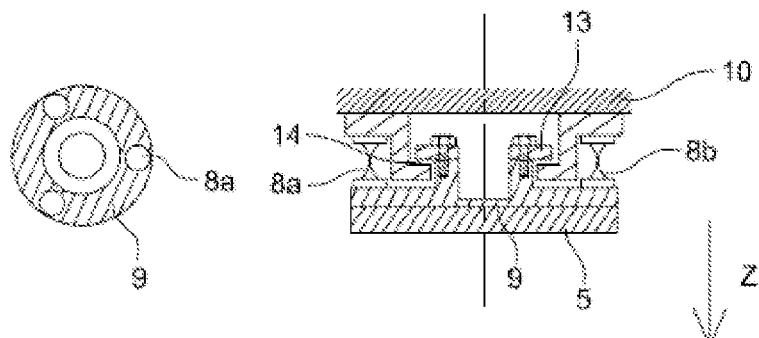

In one variant embodiment of the invention, the collimation mirror 5 is suspended by three elastomer supports 8, with collinear axes that are directed essentially along an axis that is perpendicular to the plane of the collimation mirror 8 and arranged in a triangle under the structural interface 9 (FIG. 6b).

It is understood that the high-frequency line-of-sight passive vibration-damping device that was just described is clearly simpler and less expensive than an active system, for example based on inertial sensors such as gyroscopes.

VARIANTS OF THE INVENTION

The scope of this invention is not limited to the details of the embodiments considered above by way of example but on the contrary extends to the modifications within the scope of one skilled in the art.

In a first variant, the light source 6 is mounted on an elastomer support as described and arranged in place of the collimation mirror. In this latter case, the light beam can only go one way, into the instrument, which reduces the sensitivity. Alternatively in this same variant, the light source on its elastomer substrate is placed close to the measuring detector 11, and the collimation mirror 5 is rigidly linked to the platform 10 of the optical instrument.

Alternatively, the light source 6 is attached to the platform 10 of the instrument but sends its laser beam toward a reflecting mirror (not shown in the figures) that is mounted on an elastomer support as described, arranged close to this laser source 6. This pseudo-inertial mirror places the measurement beam on the optical measurement path C'. The operating principle of the device remains essentially identical.

The description was made for the case of an instrument used in zero gravity. In a non-zero-gravity environment, the operation is similar provided that the elastomer support 8 is arranged in an essentially vertical direction, whereby the collimation mirror 8 is suspended in this support 8. The elastomer support 8 is then always subjected to a slight elongation due to gravity.

In the case of multiple supports 8a, 8b, and 8c, the operation is likewise essentially equivalent, with a collimation mirror suspended vertically to the set of supports. The latter are then, in operation under gravity, slightly laterally deformed.

As a variant of this invention, it is possible to consider other forms of elastomer support 8 than the forms with a right or diabolo cross-section as described, consequently they comprise at least one thin elongated segment.

For example, in a non-illustrated variant embodiment of the elastomer support 8, the latter is configured in the form of an essentially constant cross-sectional segment of about 1 to 2 millimeters in diameter for a suspended weight of several tens of grams, embedded in its two longitudinal ends, on the one hand at the metal structure 9 that supports the collimation mirror 5, and, on the other hand, at the platform 10 or the intermediate structure 12.

In another variant, also not illustrated, for implementing the invention, the collimation mirror 5 is suspended by N elastomer supports 8 with collinear axes directed essentially along an axis that is perpendicular to the plane of the collimation mirror 8 and arranged according to an angularly uniform arrangement under the structural interface 9.

The invention claimed is:

1. A device for measuring a line of sight jitter of an optical instrument that comprises an observation path, and said optical instrument is mounted on an optical platform, said device comprising:
    an optical measurement path that is common with the observation path of the optical instrument;
    a light measurement source that is arranged at one end of the optical observation path;
    a detector for measuring the optical beam that comes from the light measurement source, arranged in such a way that the measurement beam has passed through the optical observation path at least once; and
    at least one light reference arranged on the optical measurement path, at least one passive isolator of the light reference with regard to lateral vibrations transmitted by the optical platform in a predetermined range of frequencies, thus creating a pseudo-inertial light reference, the at least one passive isolator comprising a segment in the form of an elastomer beam that is suitable for filtering the lateral vibrations that are imposed on its support in the predetermined frequency range, and the at least one passive isolator is made of flexible material with a damping coefficient, or an elastomer material with a damping coefficient, with a so-called "diabolo" convergent/divergent cross-section.

2. The device according to claim 1, wherein the frequency isolation band of the pseudo-inertial light reference is between several Hz and several hundred Hz.

3. The device according to claim 1, wherein the pseudo-inertial light reference is a collimation mirror that is designed for the reflection of the optical beam, arranged on the optical observation path, at the other end of the optical observation path, relative to the light measurement source.

4. The device according to claim 1, wherein the pseudo-inertial light reference is the light source equipped with the at least one passive isolator.

5. The device according to claim 1, wherein the at least one passive isolator is an elastomer material with a constant cross-section that is made integral at two ends, on one end at a structure that supports the pseudo-inertial light reference, and, on the other end, at the optical platform.

6. The device according to claim 1, wherein the pseudo-inertial light reference is suspended by N passive isolators (N>1) with collinear axes, parallel to a vertical axis of a collimation mirror suspended by the N passive isolators, and arranged uniformly over a circle under a structural interface of the pseudo-inertial light reference.

7. The device according to claim 1, wherein the pseudo-inertial light reference is suspended by one passive isolator, directed along an axis that is perpendicular to the collimation mirror.

8. A device for active monitoring of high-frequency vibrations of an optical instrument's line of sight, said monitoring device comprising a jitter measuring device according to claim 1, and in addition, means for correcting an offset of the optical observation beam by manipulating an orientation of a controllable plane mirror that is placed on the optical observation path.

9. A device for measuring a line of sight jitter of an optical instrument that comprises an observation path, and said optical instrument is mounted on an optical platform, said device comprising:
    an optical measurement path that is common with the observation path of the optical instrument;
    a light measurement source that is arranged at one end of the optical observation path;
    a detector for measuring the optical beam that comes from the light measurement source, arranged in such a way that the measurement beam has passed through the optical observation path at least once; and
    at least one light reference that is arranged on the optical measurement path, means for passive isolation of the light reference with regard to lateral vibrations transmitted by the optical platform in a predetermined range of frequencies, thus creating a pseudo-inertial light reference; and
    a rigid intermediate structure, made integral at one end with the platform of the optical instrument, whereby the intermediate structure comprises means for limitation of movement of a structural interface of the pseudo-inertial light reference, when the instrument is subjected to acceleration conditions encompassed in a predetermined range, greater than those encountered during normal operation.

10. The device according to claim 9, wherein the intermediate structure comprises lower edges that work with stops, made integral with the structural interface of the pseudo-inertial light reference, the respective arrangement of the stops and lower edges of the intermediate structure determining a free space when the optical instrument is under normal operation, or in zero gravity for use in orbit.

11. A device for measuring a line of sight jitter of an optical instrument that comprises an observation path, whereby said optical instrument is mounted on an optical platform, said device comprising:
- an optical measurement path that is primarily common with the observation path of the optical instrument;
- a light measurement source that is arranged essentially at one end of the optical observation path;
- a detector for measuring the optical beam that comes from the light measurement source, arranged in such a way that this measurement beam has passed through the optical observation path at least once; and
- at least one light reference that is arranged on the optical measurement path, at least one passive isolator of the light reference with regard to lateral vibrations transmitted by the optical platform in a predetermined range of frequencies, thus creating a pseudo-inertial light reference, the at least one passive isolator comprising a segment in the form of an elastomer beam that is suitable for filtering the lateral vibrations that are imposed on its support in the predetermined frequency range,
- wherein the pseudo-inertial light reference is suspended by N passive isolators that have their axes arranged in a same plane that is perpendicular to the direction of a vertical axis of the collimation mirror suspended by the N passive isolators, whereby these N axes merge at the vertical axis of the collimation mirror, the passive isolators being uniformly angularly spaced.

* * * * *